Aug. 25, 1925.
B. C. SMITH
FUEL INJECTION VALVE
Filed May 14, 1925
1,551,508
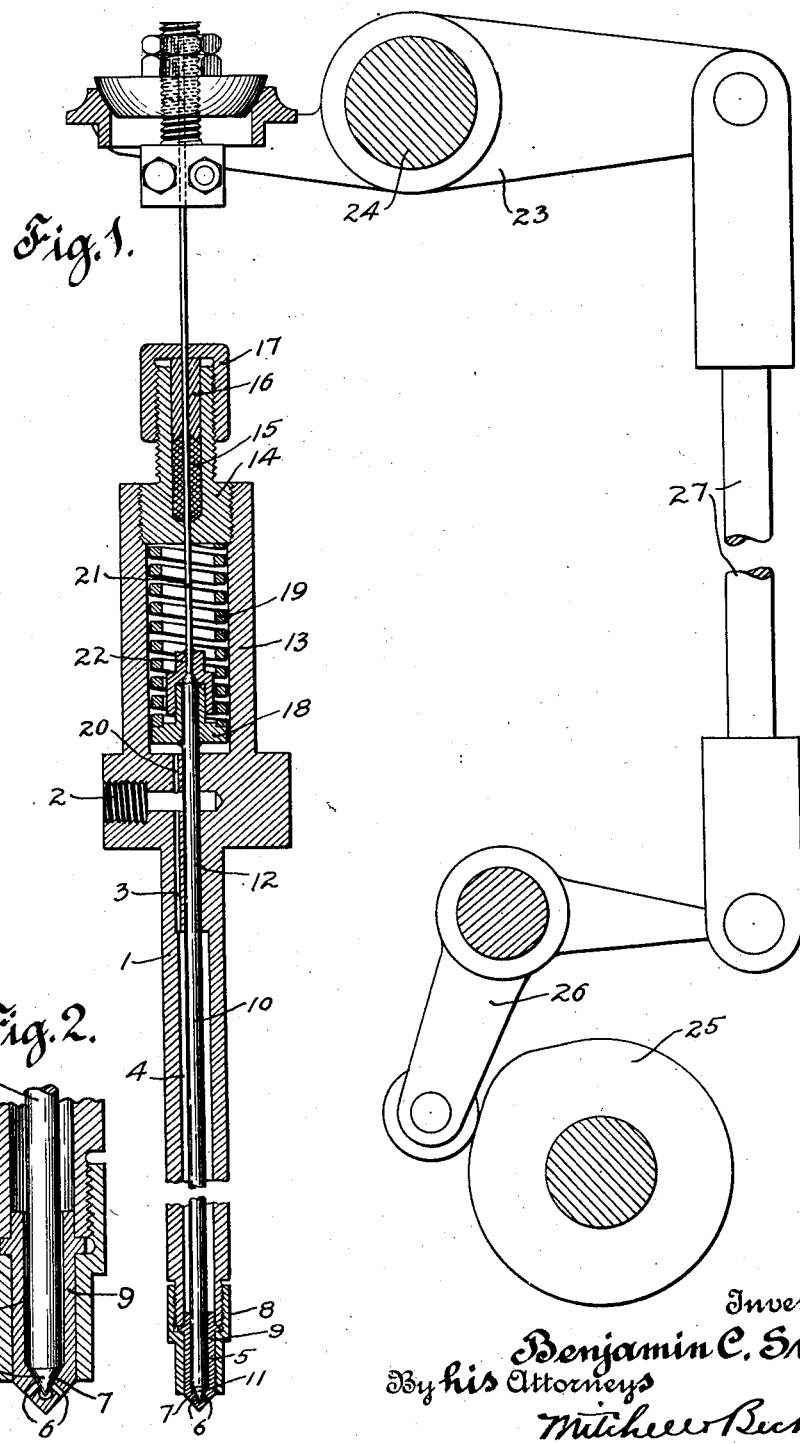
Inventor
Benjamin C. Smith
By his Attorneys
Mitchell Bechert Patented Aug. 25, 1925.

1,551,508

UNITED STATES PATENT OFFICE.

BENJAMIN C. SMITH, OF BAYONNE, NEW JERSEY, ASSIGNOR TO STANDARD MOTOR CONSTRUCTION COMPANY, OF JERSEY CITY, NEW JERSEY, A CORPORATION OF NEW JERSEY.

FUEL-INJECTION VALVE.

Application filed May 14, 1925. Serial No. 30,202.

*To all whom it may concern:*

Be it known that I, BENJAMIN C. SMITH, a citizen of the United States of America, residing at Bayonne, New Jersey, have invented a new and useful Fuel-Injection Valve, of which the following is a specification.

My invention relates to a valve and particularly to a high pressure fuel injection valve for an oil engine.

The introduction of fuel into the cylinder of an oil burning engine is usually at a very high pressure. In the valves with which I am familiar, the static pressure of the high pressure fuel acting below the valve when the valve is off its seat has required exceedingly heavy springs for urging the valve onto its seat and the mechanism for raising the same must act against and overcome the pressure of the exceedingly stiff and heavy springs before the valve may be opened. These heavy springs sometimes cause the valve stem to buckle and there are other disadvantages attendant upon the use of such very heavy springs.

It is the general object of my invention, therefore, to overcome in a large measure, the difficulties above pointed out.

It is a more specific object to provide a valve which will be partly balanced so far as fluid pressure is concerned when the valve is off its seat.

It is a further object to provide a valve for high pressure fluids wherein a relatively light spring will suffice to force the valve onto its seat.

It is a still more specific object to provide a valve with a tension member, for actuating the same, formed of piano wire or the like. Other objects will appear as the specification proceeds.

Briefly stated, in the preferred form of the invention I employ a valve substantially all of which is subjected to the fluid pressure when the valve is off its seat. A spring may be employed for urging the valve onto its seat. A tension member of comparatively small cross-section, preferably in the form of a high tensile strength material such as piano wire, is attached to the valve and passes through a stuffing box, on the outside of which it is attached to mechanism for raising the valve at the proper moment. The tension member being of smaller cross section than the valve permits the latter to be partly balanced so that a relatively light spring may be employed since such spring need be only slightly stronger than is required to overcome friction and the unbalanced static pressure acting upon area equivalent to the cross section of the tension member.

In the drawings which show, for illustrative purposes only, a preferred form of the invention:

Fig. 1 is a sectional view through a valve illustrating features of my invention and employing valve actuating mechanism of conventional type;

Fig. 2 is a relatively enlarged fragmentary sectional view of the lower end of the valve.

In said drawings, 1 indicates what may be termed a valve casing having a fluid inlet port 2 communicating with passages 3, 4 and 5, leading to the ports 6—6 in the valve seat 7. It will be understood that the valve casing up to the boss having the inlet 2, will be passed through a suitable bore in the cylinder head and secured therein.

In the form shown, the lower end of the casing 1 may be threaded to receive the coupling 8 securing a valve seat sleeve 9 onto the lower end thereof. 10 indicates a valve member which in the form shown is a relatively long rod formed at the lower end 11 so as to properly fit the seat 7 in the sleeve 9 so as to open or close communication through the ports 6—6. The sleeve 9 preferably fits the valve member 10 rather loosely so as to permit of the passage of fluid between the valve and the sleeve and yet act as a loose guide for the lower end of the valve member. If desired, near the inlet connection 2 the valve casing may have a bore 12 which may fit the valve member 10 quite closely so as to act as an additional guide.

At the upper end of the casing 1, there is preferably provided what may be termed a spring housing 13 closed at the top by means of a plug 14 carrying the packing 15 and the gland 16 which latter is urged onto the packing by means of the nut 17 for forming a tight stuffing box for the valve actuating tension member to be described.

At the upper end of the valve member 10 there may be a nut or other abutment 18 preferably rigidly secured thereon and serving as an abutment for the lower end of the spring 19, the other end of which acts against the inner face of the plug 14. 20 indicates a fluid passage from the inlet 2 so as to permit all of the parts within the spring chamber 13 to be under substantially the same fluid pressure as the other part of the valve. It will be obvious that the spring 19 is designed to urge the valve member 10 downwardly onto its seat 7 and the spring should be of such strength as to overcome the unbalanced static fluid pressure, the friction of the various parts, and to effect the required speed of operation.

Now in order to reduce the unbalanced static pressure of the fluid acting on the valve when it is unseated I prefer to make a valve raising tension member 21 of a cross-section relatively smaller than that of the valve member. I have found that a member formed of high tensile strength material, such as piano wire, is admirably suited for raising the valve member and since the spring 19 acts continually, the actuating member 21 will always be under tension and never under compression while the valve member is raised. In the form shown, I attach the lower end of the tension member to a nut 22 which is secured to the abutment 18 and consequently to the valve member 10. The valve actuating tension member passes through the plug and stuffing box heretofore described and the upper end is secured by suitable means to a lever 23 pivoted to the engine at 24. The cam 25 acting through the bell crank follower 26 serves by means of the connecting link 27 to oscillate the lever 23 and raise the valve at the proper moment.

Now it will be obvious that when the valve member 10 is off its seat the fluid pressure through the inlet 2 will act above and below the valve since all parts are in communication with the fluid inlet and the parts 6—6 are relatively restricted, and the valve will be substantially balanced so far as static fluid pressure is concerned except for the area of the valve actuating tension member 21 and since this member is purposely made of smaller cross-section than the valve, the fluid pressure will be partly balanced and the spring 19 may therefore be relatively light. When the valve is seated, the fluid pressure is, of course, unbalanced and the static pressure urging the valve toward its seat is proportional to the area of that portion of the valve which is seated less the area of the tension member 21. It will thus be seen that a relatively light spring may be employed with a valve made in accordance with my invention and, therefore, the valve raising member 21 may be of relatively small cross-section, particularly since it is never under compression but is always under tension when active.

While the invention has been described in some detail and for a specific use, I do not wish to be confined to the specific form shown nor to the specific use since changes may be made within the scope of the invention as defined in the appended claims.

I claim:

1. In a valve, a valve casing having a valve seat therein, a valve member to cooperate with said seat, a piano wire of relatively small cross-section attached to said valve member for raising the latter from the seat, said piano wire extending through a stuffing box in the valve casing, a spring in the valve casing for urging said valve member onto the seat, said valve member and spring being in communication with the fluid in said valve casing whereby when the valve member is in open position the fluid pressure tending to force said valve member away from the seat will be the fluid pressure acting upon the area of the piano wire, and when the valve is seated the fluid pressure tending to force the valve onto the seat will be the pressure acting upon the area of that portion of the valve on the seat less the area of the piano wire.

2. In a valve, a valve casing having a valve seat, a valve member to cooperate with said seat, a spring for urging said valve member onto the seat, a tension member of relatively small cross-section attached to said valve member and extending to the outside of said valve casing, said valve member and part of said tension member being in communication with the fluid in the valve casing whereby when the valve member is off its seat the fluid pressure acting thereon will be substantially balanced except for the area of the tension member.

3. In a valve, a valve casing having a valve seat therein, a valve member to cooperate with said seat, and a piano wire tension member for raising said valve member from the seat.

4. In a valve, a valve casing having a valve seat therein, a relatively long valve member guided in said casing, said casing having a fluid inlet therein and a passage along the valve member, a spring housing on said casing and having a passage opening communication between the valve casing and housing, a spring in said housing for urging said valve member onto the seat, a tension member of relatively small cross-section extending into said spring housing and attached to said valve member for raising the latter from the seat, whereby when the valve member is off its seat the fluid pressure acting on the valve member will be substantially balanced except for the area of the tension member.

BENJAMIN C. SMITH.